(12) United States Patent
Nakanishi et al.

(10) Patent No.: US 10,365,631 B2
(45) Date of Patent: Jul. 30, 2019

(54) INSTRUCTION GENERATING DEVICE

(71) Applicant: OMRON Corporation, Kyoto-shi, Kyoto (JP)

(72) Inventors: Ryuichiro Nakanishi, Yokohama (JP);
Junji Shimamura, Takatsuki (JP);
Yosuke Iwai, Kusatu (JP); Hiroshi Sawaragi, Otsu (JP); Nobuhiro Harada, Yokohama (JP)

(73) Assignee: OMRON Corporation, Kyoto-shi (JP)

( * ) Notice: Subject to any disclaimer, the term of this patent is extended or adjusted under 35 U.S.C. 154(b) by 442 days.

(21) Appl. No.: 15/279,483

(22) Filed: Sep. 29, 2016

(65) Prior Publication Data
US 2017/0123404 A1 May 4, 2017

(30) Foreign Application Priority Data

Oct. 30, 2015 (JP) .................................. 2015-214922

(51) Int. Cl.
*G05B 19/402* (2006.01)
*G05B 19/404* (2006.01)
(Continued)

(52) U.S. Cl.
CPC ......... *G05B 19/402* (2013.01); *G05B 19/404* (2013.01); *G05B 19/416* (2013.01);
(Continued)

(58) Field of Classification Search
None
See application file for complete search history.

(56) References Cited

U.S. PATENT DOCUMENTS

2003/0184251 A1    10/2003    Oyama et al.
2004/0183494 A1    9/2004    Nagaoka et al.
(Continued)

FOREIGN PATENT DOCUMENTS

CN    1448816 A    10/2003
CN    1523465 A    8/2004
(Continued)

OTHER PUBLICATIONS

Makoto Iwasaki et al., "Method for Designing Optimum Position Instruction of Robot Arm in Consideration of Vibration Suppression Effect (Optimal Command Shaping for Vibration Suppression in Robot Arm Motion)", The Institute of Electrical Engineers of Japan, 1997, p. 50-p. 56, vol. 117-C, No. 1, Japan.
(Continued)

*Primary Examiner* — Sean Shechtman
(74) *Attorney, Agent, or Firm* — Metrolexis Law Group, PLLC

(57) ABSTRACT

A desired position instruction of a user is generated even if a plurality of position instructions satisfying a vibration control condition exist. An instruction generator includes a conditional expression selector configured to select a conditional expression that should generate the position instruction from a plurality of conditional expressions based on a control performance condition, a parameter calculator configured to calculate a parameter based on a machine performance index and the selected vibration control conditional expression, and a position instruction generator configured to calculate the position instruction based on the parameter.

21 Claims, 9 Drawing Sheets

(51) Int. Cl.
    *G05B 19/416*        (2006.01)
    *G05B 19/4155*       (2006.01)
(52) U.S. Cl.
    CPC ............... *G05B 19/4155* (2013.01); *G05B 2219/35215* (2013.01); *G05B 2219/36086* (2013.01); *G05B 2219/36223* (2013.01); *G05B 2219/37435* (2013.01)

(56) References Cited

U.S. PATENT DOCUMENTS

| | | | |
|---|---|---|---|
| 2007/0067049 A1* | 3/2007 | Zhou | G05B 5/01 700/28 |
| 2009/0177296 A1 | 7/2009 | Ueda et al. | |
| 2012/0194121 A1* | 8/2012 | Miyaji | G05B 19/404 318/615 |

FOREIGN PATENT DOCUMENTS

| | | | |
|---|---|---|---|
| CN | 1845021 | A | 10/2006 |
| CN | 101536305 | A | 9/2009 |
| CN | 104756399 | A | 7/2015 |
| EP | 0905593 | A1 | 3/1999 |
| JP | 2000-298521 | A | 10/2000 |
| JP | 2006-277621 | A | 10/2006 |
| JP | 4601659 | B2 | 12/2010 |

OTHER PUBLICATIONS

Office action dated May 27, 2019 in a counterpart Chinese patent application.

* cited by examiner

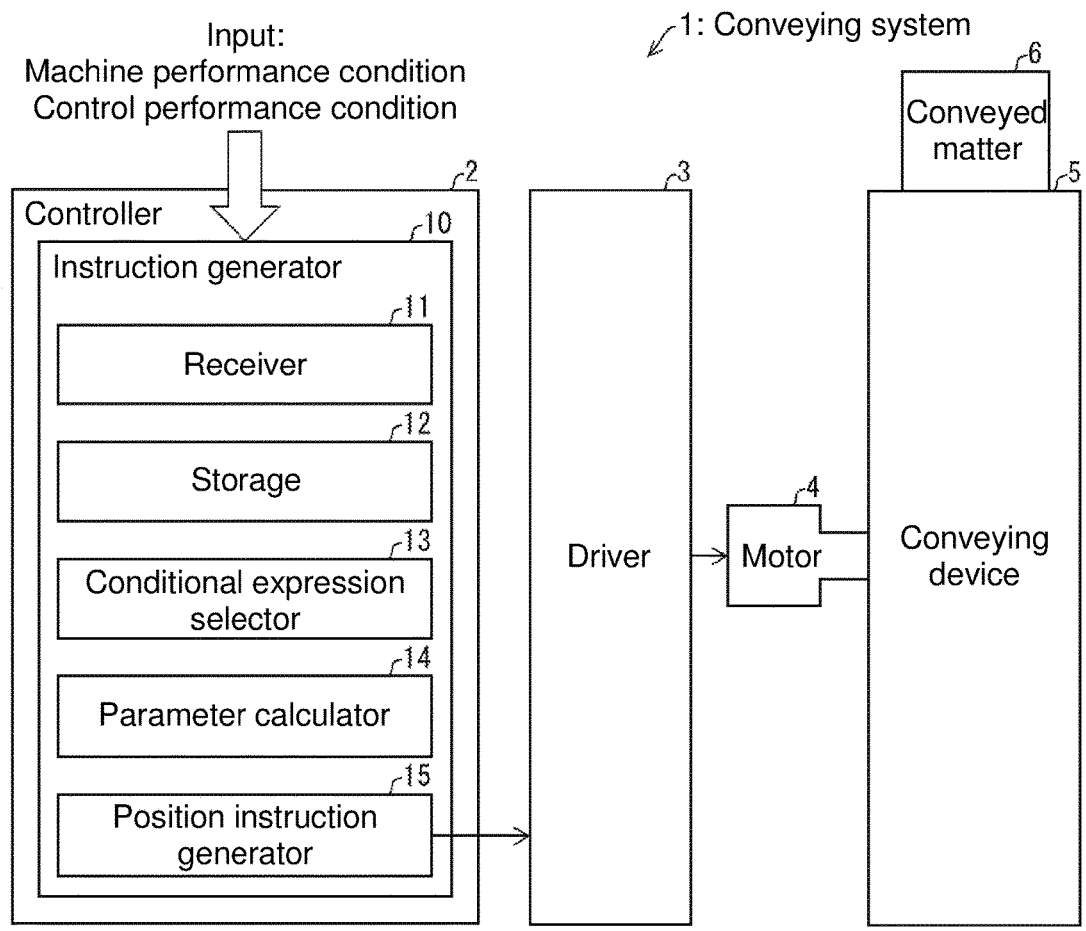

Conditional expression 1

Conditional expression 2

INSTRUCTION GENERATING DEVICE

CROSS-REFERENCE TO RELATED APPLICATION

This application is based on Japanese Patent Application No. 2015-214922 filed with the Japan Patent Office on Oct. 30, 2015, the entire contents of which are incorporated herein by reference.

FIELD

The present invention relates to an instruction generating device that generates a position instruction in moving a device.

BACKGROUND

Various machines, such as an industrial robot and a conveying device, which are driven with a power generator such as a motor, are controlled according to the position instruction output from a controller to a driver. Based on the position instruction, the driver calculates a torque to be output from the motor and a current value to be input to the motor, and drives the motor. As used herein, the position instruction is an instruction to designate a position after a predetermined time elapses since a current clock time in the motor or a member driven with the motor.

In recent years, there has been a research on a vibration control technology for suppressing a vibration generated in the machine by satisfying a condition (hereinafter, referred to as a vibration control condition) that does not excite the vibration of a natural frequency of the machine. In the case that the vibration control technology is applied, the controller outputs the position instruction satisfying the vibration control condition to the driver. The driver drives the motor based on the position instruction. Therefore, the vibration of the machine can be suppressed. For example, in the case that the machine is the conveying device, the conveyed matter can be conveyed while the vibration is suppressed.

Conditional expressions satisfying the vibration control condition are disclosed in various documents. Japanese Patent No. 4601659 discloses a conditional expression that generates the position instruction in which the vibration control condition is satisfied while a limiting value of maximum acceleration is satisfied. A conditional expression satisfying the vibration control condition is also disclosed in "Method for designing optimum position instruction of robot arm in consideration of vibration suppression effect" by Makoto Iwasaki and Nobuyuki Matsui, The Institute of Electrical Engineers of Japan, Transactions of Electronics, Information and Systems C, Vol. 117-C, No. 1, p 50-p 56, 1997

SUMMARY

In the case that the vibration control technology is applied, it is necessary to consider a machine control target (for example, a target indicating which one of a traveling distance, a traveling time, an effective load ratio of the motor, and the maximum acceleration of the motor is prioritized) intended by a user.

However, when there are plural position instructions satisfying the vibration control condition, it is difficult for the user to properly select the conditional expression matched with the control target. For this reason, it is difficult to efficiently operate the machine according to a desired control target of the machine. Adjustment or check of the machine to select proper conditional expression may increase a man-hour.

In view of the above problems, an object of the present invention is to generate the position instruction matched with the desired control target of the user even if the plural position instructions satisfying the vibration control condition exist.

According to one aspect of the present invention, a position instruction device is an instruction generating device that generates a position instruction of instruction information to drive a machine, the instruction generating device includes: a receiver configured to receive input of a machine performance index including at least a target traveling distance, a target traveling time, and a resonance frequency of a vibration to become a vibration control target; a storage in which plural vibration control conditional expressions are stored, the plural vibration control conditional expressions calculating a parameter of the position instruction suppressing the vibration based on the machine performance index; a conditional expression selector configured to select the vibration control conditional expression that should generate the position instruction from the plural vibration control conditional expressions based on a control performance index indicating an item to be prioritized during drive control of the machine; a parameter calculator configured to calculate the parameter based on the machine performance index and the selected vibration control conditional expression; and a position instruction generator configured to calculate the position instruction based on the parameter calculated with the parameter calculator.

In the above configuration, the conditional expression selector selects the vibration control conditional expression that should generate the position instruction from the plural vibration control conditional expressions, which calculate the parameter of the position instruction suppressing the vibration based on the machine performance index, based on the control performance index indicating the item to be prioritized during the drive control of the machine. Therefore, the conditional expression selector can select the optimum vibration control conditional expression in order to satisfy the control performance index indicating the item to be prioritized during the drive control of the machine.

The parameter calculator calculates the parameter based on the machine performance index and the selected vibration control conditional expression. The position instruction generator calculates the position instruction based on the parameter calculated with the parameter calculator. Therefore, the position instruction, which satisfies the machine performance index or is close to the machine performance index, can be generated according to the control performance index indicating the item to be prioritized during the drive control of the machine.

Therefore, the position instruction matched with the desired control target of the user can be generated even if the plural position instructions satisfying the vibration control condition exist.

Preferably the receiver receives the input of the control performance index, and the conditional expression selector selects the vibration control conditional expression based on the control performance index received with the receiver. The user-friendly instruction generating device can be obtained because the user can produce the control performance index changed according to a situation and input the control performance index to the receiver.

Preferably the control performance index includes at least one of a first control performance index prioritizing the target traveling time, a second control performance index prioritizing the load reduction of a power generator that generates power to drive the machine, and a third control performance index prioritizing the target traveling time and the load reduction of the power generator.

In the above configuration, the control performance index includes the control target probably desired by the user, so that the position instruction generator can generate the position instruction satisfying the more desirable index of the user.

Preferably a priority set to each of the vibration control conditional expressions is stored in the storage in each control performance index, the conditional expression selector selects the vibration control conditional expression having a highest priority corresponding to the input control performance index from the plural vibration control conditional expressions, and the parameter calculator calculates the parameter satisfying both the machine performance index and the vibration control conditional expression having the highest priority. In the above configuration, the position instruction matched with the desired control target of the user can be generated even if the plural position instructions satisfying the vibration control condition exist.

Preferably processing, in which the conditional expression selector selects the vibration control conditional expression having a second highest priority from the plural vibration control conditional expressions and the parameter calculator calculates the parameter satisfying both the machine performance index and the vibration control conditional expression having the second highest priority, is repeatedly performed when the receiver receives the input of the first control performance index, and when the parameter calculator hardly calculates the parameter satisfying both the machine performance index and the selected vibration control conditional expression. In the above configuration, the position instruction generator can generate the position instruction prioritizing the target traveling time that is the desired control target of the user.

Preferably, when the parameter calculator hardly calculates the parameter satisfying both the machine performance index and the vibration control conditional expression with respect to all the vibration control conditional expressions, the parameter calculator performs extraction processing of calculating a parameter satisfying the vibration control conditional expression and the machine performance index except for the target traveling time with respect to each of the vibration control conditional expressions and of extracting the parameter closest to the target traveling time from the calculated parameters. In the above configuration, the position instruction generator can generate the position instruction prioritizing the target traveling time that is the desired control target of the user.

Preferably the priority corresponding to the first control performance index is set to each vibration control conditional expression according to time from acceleration start to deceleration end, the time being obtained from a solution calculated using an identical frequency with respect to each vibration control conditional expression. Thus, the priority corresponding to the first control performance index can be decided.

Preferably, when the receiver receives the input of the second control performance index, and when the parameter calculator hardly calculates the parameter satisfying both the machine performance index and the selected vibration control conditional expression, the parameter calculator performs extraction processing of calculating a parameter satisfying the selected vibration control conditional expression and the machine performance index except for the target traveling time and of extracting the parameter closest to the target traveling time from the calculated parameters. In the above configuration, the position instruction generator can generate the position instruction prioritizing the load reduction of the power generator that generates the power to drive the machine, the load reduction of the power generator being the desired control target of the user.

Preferably processing, in which the conditional expression selector selects the vibration control conditional expression having the second highest priority and the parameter calculator calculates the parameter based on the vibration control conditional expression, is repeatedly performed when the parameter calculator hardly extracts the parameter in the extraction processing. In the above configuration, the position instruction generator can generate the position instruction prioritizing the load reduction of the power generator that generates the power to drive the machine, the load reduction of the power generator being the desired control target of the user.

Preferably the priority corresponding to the second control performance index is set to each vibration control conditional expression according to a load ratio of the power generator, the load ratio being obtained from a solution calculated using an identical frequency with respect to each vibration control conditional expression. Thus, the priority corresponding to the second control performance index can be decided.

Preferably processing, in which the conditional expression selector selects the vibration control conditional expression having a second highest priority from the plural vibration control conditional expressions and the parameter calculator calculates the parameter satisfying both the machine performance index and the vibration control conditional expression having the second highest priority, is repeatedly performed when the receiver receives the input of the third control performance index, and when the parameter calculator hardly calculates the parameter satisfying both the machine performance index and the selected vibration control conditional expression. In the above configuration, the position instruction generator can generate the position instruction prioritizing the load reduction of the power generator and the target traveling time, the load reduction and the target traveling time being the desired control target of the user.

Preferably, when the parameter calculator hardly calculates the parameter satisfying both the machine performance index and the vibration control conditional expression with respect to all the vibration control conditional expressions, the conditional expression selector performs extraction processing of calculating a parameter satisfying the vibration control conditional expression and the machine performance index except for the target traveling time with respect to each of the vibration control conditional expressions and of extracting the parameter closest to the target traveling time from the calculated parameters. In the above configuration, the position instruction generator can generate the position instruction prioritizing the load reduction of the power generator and the target traveling time, the load reduction of the power generator and the target traveling time being the desired control target of the user.

According to another aspect of the present invention, a position instruction device is an instruction generating device that generates a position instruction of instruction information to drive a machine, the instruction generating device includes: a receiver configured to receive input of a machine performance index including at least a target traveling distance, a target traveling time, and a resonance frequency of a vibration to become a vibration control target; a parameter calculator configured to calculate a parameter based on the machine performance index and each of plural vibration control conditional expressions with respect to the plural vibration control conditional expressions calculating the parameter of the position instruction suppressing the vibration based on the machine performance index; a parameter evaluator configured to evaluate the calculated parameter based on a control performance index indicating an item to be prioritized during drive control of the machine; a position instruction generator configured to generate the position instruction based on the parameter most highly evaluated with the parameter evaluator.

In the above configuration, the parameter calculator calculates the parameter based on the machine performance index and the vibration control conditional expression with respect to each of the plural vibration control conditional expressions, which calculate the parameter of the position instruction suppressing the vibration based on the machine performance index. The parameter evaluator evaluates the calculated parameter based on the control performance index indicating the item to be prioritized during drive control of the machine. The position instruction generator generates the position instruction based on the parameter most highly evaluated with the parameter evaluator.

Therefore, the position instruction, which satisfies the machine performance index or is close to the machine performance index, can be generated according to the control performance index indicating the item to be prioritized during the drive control of the machine.

Therefore, the position instruction matched with the desired control target of the user can be generated even if the plural position instructions satisfying the vibration control condition exist.

Preferably the parameter calculator calculates the parameter satisfying both the machine performance index and the vibration control conditional expression with respect to each of the plural vibration control conditional expressions. In the above configuration, the position instruction generator calculates the position instruction based on the parameter calculated with the parameter calculator. Therefore, the position instruction satisfying the machine performance index can be generated according to the control performance index indicating the item to be prioritized during the drive control of the machine. Therefore, the position instruction matched with the desired control target of the user can be generated even if the plural position instructions satisfying the vibration control condition exist.

When the parameter calculator hardly calculates the parameter satisfying both the machine performance index and the vibration control conditional expression with respect to each of the plural vibration control conditional expressions, the parameter calculator performs extraction processing of calculating a parameter satisfying the vibration control conditional expression and the machine performance index except for the target traveling time with respect to the vibration control conditional expression and of extracting the parameter closest to the target traveling time from the calculated parameters.

In the above configuration, the position instruction generator calculates the position instruction based on the parameter calculated with the parameter calculator. Therefore, the position instruction, which satisfies the machine performance index except for the target traveling time and is close to the target traveling time, can be generated, according to the control performance index indicating the item to be prioritized during the drive control of the machine. Therefore, the position instruction matched with the desired control target of the user can be generated even if the plural position instructions satisfying the vibration control condition exist.

The receiver receives the input of the control performance index, and the parameter evaluator evaluates the calculated parameter based on the control performance index received with the receiver. The user-friendly instruction generating device can be obtained because the user can produce the control performance index changed according to a situation and input the control performance index to the receiver.

Preferably the control performance index includes at least one of a first control performance index prioritizing the target traveling time, a second control performance index prioritizing the load reduction of a power generator that generates power to drive the machine, and a third control performance index prioritizing the target traveling time and the load reduction of the power generator. In the above configuration, the control performance index includes the index probably desired by the user, so that the position instruction generator can generate the position instruction satisfying the more desirable index of the user.

Preferably, when the receiver receives the input of the first control performance index, the parameter evaluator most highly evaluates a parameter of a traveling time closest to the target traveling time in the parameters calculated with the parameter calculator. In the above configuration, the position instruction generator can generate the position instruction prioritizing the target traveling time that is the desired control target of the user.

Preferably, when the receiver receives the input of the second control performance index, the parameter evaluator most highly evaluates a parameter having a smallest load ratio of the power generator in the parameters calculated with the parameter calculator. In the above configuration, the position instruction generator can generate the position instruction prioritizing the load reduction of the power generator that generates the power to drive the machine, the load reduction of the power generator being the desired control target of the user.

Preferably, when the receiver receives the input of the third control performance index, the parameter evaluator most highly evaluates a parameter of a traveling time closest to the target traveling time in the parameters calculated with the parameter calculator. In the above configuration, the position instruction generator can generate the position instruction prioritizing the load reduction of the power generator and the target traveling time, the load reduction of the power generator and the target traveling time being the desired control target of the user.

Preferably, when plural parameters to become a traveling time closest to the target traveling time exist, the parameter evaluator most highly evaluates a parameter of a traveling time having the smallest load ratio of the power generator in the plural parameters. In the above configuration, the position instruction generator can generate the position instruction prioritizing the load reduction of the power generator and the target traveling time, the load reduction of the power generator and the target traveling time being the desired control target of the user.

In the present invention, the position instruction matched with the desired priority of the user can be generated even if the plural position instructions satisfying the vibration control condition exist.

BRIEF DESCRIPTION OF THE DRAWINGS

FIG. 1 is a view illustrating a configuration of a conveying device according to a first embodiment of the present invention;

FIG. 2 is a view illustrating a state in which a priority is given to each conditional expression of the conveying device of the first embodiment;

DETAILED DESCRIPTION

First Embodiment

Figure 3:
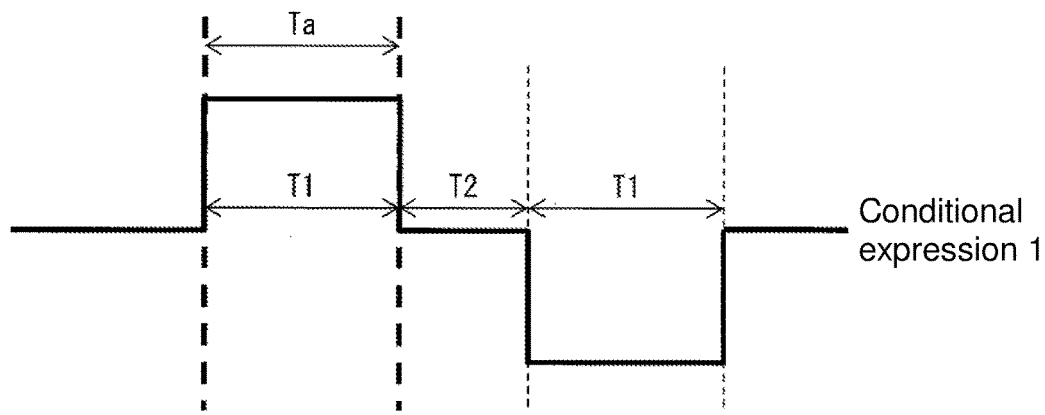
FIG. 3 is a view illustrating a profile of a position instruction generated from a conditional expression 1.

A first embodiment of the present invention will be described below with reference to FIGS. 1 to 8, 11, and 12. In the following description, a machine that is a vibration control target is a conveying device that conveys a conveyed matter. However, the machine that is the vibration control target is not limited to the conveying device.

(Configuration of Conveying System 1)

FIG. 1 is a view illustrating a configuration of a conveying system 1 according to the first embodiment. As illustrated in FIG. 1, the conveying system 1 includes a controller (instruction generating device) 2, a driver 3, a motor (power generator) 4, and a conveying device 5. A conveyed matter 6 that is a conveyance target is placed on the conveying device 5. The controller 2 includes an instruction generator 10. The controller 2 generates a position instruction (an instruction to designate a position after a predetermined traveling time) in order to drive the motor 4, and outputs the position instruction to the driver 3. The controller 2 controls various operations of the conveying system 1.

Based on the position instruction input from the controller 2 in each predetermined period, the driver 3 calculates a torque or current that should be output from the motor 4, and drives the motor 4 based on a calculation result.

The motor 4 is driven based on input from the driver 3 to move the conveying device 5 with a predetermined distance and velocity. The motor 4 includes an encoder, and successively feeds back a distance in which the conveying device 5 is moved to the driver 3. The conveying device 5 conveys the conveyed matter 6 based on output from the motor 4.

The instruction generator 10 included in the controller 2 generates the position instruction based on information input from a user, and outputs the generated position instruction to the driver 3. At this point, the instruction generator 10 obtains solutions of various parameters from a conditional expression such that an operating condition such as a traveling distance and a traveling time of the motor 4 or conveying device 5, a performance condition (outputtable torque) of the motor 4, and a vibration control condition are satisfied, and the instruction generator 10 generates the position instruction. The instruction generator 10 outputs the position instruction to the driver 3 in each predetermined period.

The instruction generator 10 includes a receiver 11, a storage 12, a conditional expression selector 13, a parameter calculator 14, and a position instruction generator 15.

The receiver 11 receives a machine performance condition (machine performance index) and a control performance condition (control performance index), which are input to the controller 2 by the user. The machine performance condition and the control performance condition are input values necessary for the generation of the position instruction.

The machine performance condition is set based on a desired operation in the conveying system 1. Examples of the machine performance condition include an output period (target traveling time) of the position instruction, a target traveling distance of the motor 4 or conveying device 5 for the target traveling time, and a resonance frequency of a vibration (a vibration of a vibration control target) to be suppressed in the conveying device 5.

The control performance condition indicates an item (index) that should be prioritized in controlling the motor 4 or conveying device 5 when the conveying system 1 is designed. That is, the control performance condition includes information indicating the item (index) which the user wants to prioritize during the control. The following first to third control performance conditions can be cited as a typical example of the control performance condition.

The first control performance condition (first vibration control performance index) is a condition that prioritizes the position instruction closest to the target traveling time set as the machine performance condition in the position instruction suppressing the vibration of the resonance frequency set as the machine performance condition, and is a condition that prioritizes the target traveling time. The second control performance condition (second vibration control performance index) is a condition that prioritizes the position instruction suppressing the increase in load ratio of the motor 4 as much as possible in the position instruction suppressing the vibration of the resonance frequency set as the machine performance condition, and is a condition that prioritizes load ratio reduction of the motor 4. The third control performance condition (third vibration control performance index) is a combination of the first and second control performance conditions, and is a condition that prioritizes the position instruction closest to the target traveling time while the motor load ratio is reduced as much as possible.

In the first embodiment, the first to third control performance conditions are adopted as the control performance condition. Because the first to third control performance conditions include an index probably desired by the user, the position instruction generator 15 can generate the position instruction satisfying the more desirable index of the user.

The first to third control performance conditions are examples of the control performance condition, but the control performance condition is not limited to the first to third control performance conditions. In addition to the first to third control performance conditions, the control performance condition may include a condition including an item that should be prioritized during the control of the motor 4 or conveying device 5 in the design of the conveying system 1.

In the first embodiment, the receiver 11 receives the input of the control performance condition from the user. The user may produce the control performance condition including the item that should be prioritized in the design of the conveying system 1, and input the control performance condition to the receiver 11. Therefore, a user-friendliness position instruction generating device can be obtained. The control performance condition is not necessarily input by the user every time, and the control performance condition may previously be stored in the controller.

Plural conditional expressions used to generate the position instruction from the machine performance condition and the control performance condition are stored in the storage 12. The conditional expressions stored in the storage 12 are conditional expressions (vibration control conditional expression) to control the vibration of the resonance frequency. Each conditional expression is stored in the storage 12 while a priority is given to the conditional expression according to the control performance condition input by the user. The conditional expression will be described in detail later.

The conditional expression selector 13 refers to the storage 12 to select the conditional expression having the highest priority corresponding to the control performance condition input by the user. Therefore, based on the control performance condition input by the user, the conditional expression selector 13 can select the optimum conditional expression in order to satisfy the machine performance condition.

The parameter calculator 14 calculates a parameter to uniquely calculate the position instruction based on the machine performance index input by the user and the conditional expression selected with the conditional expression selector 13. Examples of the parameter include acceleration and velocity.

The position instruction generator 15 generates the position instruction based on the parameter calculated with the parameter calculator 14, and outputs the generated position instruction to the driver 3 as an instruction value in each predetermined period. The position instruction generator 15 can generate the position instruction, which satisfies the machine performance index or is close to the machine performance index, according to the first to third control performance conditions. Therefore, the position instruction matched with the desired control performance condition of the user can be generated even if the plural position instructions satisfying the vibration control condition exist.

(Vibration Control Conditional Expression)

FIG. 2 is a view illustrating a storage example of the storage 12. As illustrated in FIG. 2, a priority corresponding to the control performance condition is stored in the storage 12 with respect to each of the plural conditional expressions.

In FIG. 2, the priority corresponding to the first control performance condition (the target traveling time is prioritized) and the priority corresponding to the second control performance condition (the motor load reduction is prioritized) are given to each conditional expression. Because the priority corresponding to the third control performance condition (both the motor load reduction and the target traveling time are prioritized) is identical to the priority corresponding to the second control performance condition, the priority corresponding to the third control performance condition is omitted in FIG. 2.

For example, in a conditional expression 1, a priority "2" is given to the first control performance condition in which the item to be prioritized during the control of the conveying system 1 is the "target traveling time", and a priority "1" is given to the second control performance condition in which the item to be prioritized is the "motor load reduction". In a conditional expression 2, the priority "1" is given to the first control performance condition, and the priority "2" is given to the second control performance condition.

Therefore, the higher-priority conditional expression 2 corresponding to the first control performance condition is selected when the user inputs the first control performance condition (the target traveling time is prioritized) as the control performance condition. On the other hand, the higher-priority conditional expression 1 corresponding to the second control performance condition is selected when the user inputs the second control performance condition (the motor load reduction is prioritized) as the control performance condition. Similarly, the higher-priority conditional expression 1 corresponding to the third control performance condition is selected when the user inputs the third control performance condition (both the motor load reduction and the target traveling time are prioritized) as the control performance condition.

Thus, the priority is given to the conditional expression in each control performance condition, so that the conditional expression selector 13 can select the optimum conditional expression according to the input control performance condition. The selection of the conditional expression and a position instruction generating method will be described in detail later.

Figure 4:
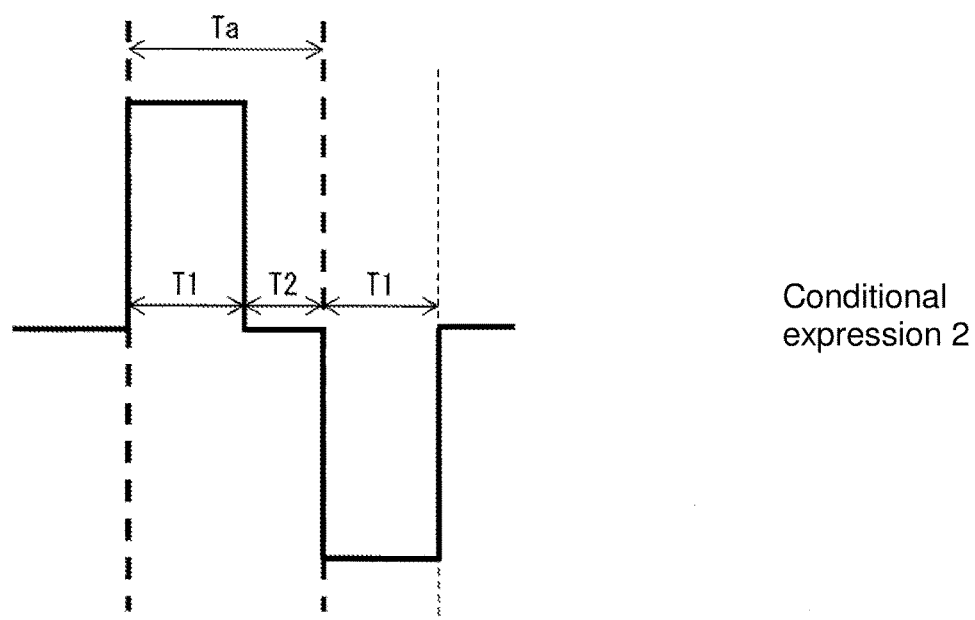
FIG. 4 is a view illustrating the profile of the position instruction generated from a conditional expression 2.

A conditional expression 1 and a conditional expression 2 that are an example of the conditional expression will be described below with reference to FIGS. 3 and 4. FIG. 3 is a view illustrating a profile of the position instruction generated from the conditional expression 1. FIG. 4 is a view illustrating the profile of the position instruction generated from the conditional expression 2. In FIGS. 3 and 4, a horizontal axis indicates a traveling time and a vertical axis indicates acceleration.

For example, <Conditional expression 1> and <Conditional expression 2> are stored in the storage 12.

<Conditional expression 1>

$$T1 = n/f \qquad \text{(equation 1)}$$

<Conditional expression 2>

$$T1 + T2 = n/f \qquad \text{(equation 2)}$$

Where f is a vibration control frequency (resonance frequency) and n is a natural number. In FIGS. 3 and 4, it is assumed that $Ta = 1/f$ holds.

Referring to FIGS. 3 and 4, in both the profiles generated by the conditional expressions 1 and 2, an initial T1 is an acceleration period, a next period T2 is a constant-velocity period, and a next T1 is a deceleration period.

In both the profiles generated by the conditional expressions 1 and 2 in FIGS. 3 and 4, the acceleration period (T1) and the deceleration period (T1) before and after the constant-velocity period (T2) are set to an identical time (symmetry).

In the vibration control condition of the conditional expression 1 in FIG. 3, T1 is set to Ta (or its multiple), which is an inverse of a vibration control frequency f that is a frequency of which vibration to be suppressed. Therefore, the position instruction suppressing the vibration of the vibration control frequency f can be produced.

In the vibration control condition of the conditional expression 2 in FIG. 4, T1+T2 is set to Ta (or its multiple). Therefore, the position instruction suppressing the vibration of the vibration control frequency f can be produced.

As illustrated in FIGS. 3 and 4, in the case that the identical vibration control frequency f is designated, the profile of the conditional expression 2 in FIG. 4 is shorter than the profile of the conditional expression 1 in FIG. 3 in a total traveling time from acceleration start to deceleration end. Therefore, in order to obtain the target traveling time input by the user, the position instruction is easily generated by the use of the position instruction generated by the conditional expression 2 rather than the use of the position instruction generated by the conditional expression 1.

On the other hand, the profile of the conditional expression 2 in FIG. 4 is larger than the profile of the conditional expression 1 in FIG. 3 in the acceleration during the acceleration period and the deceleration during the deceleration period. Therefore, the use of the position instruction generated by the conditional expression 2 is better than the use of the position instruction generated by the conditional expression 1 in a motor load reduction effect.

The better motor load reduction effect obtained by the use of the conditional expression 2 rather than the use of the conditional expression 1 will be described below.

Figure 5:
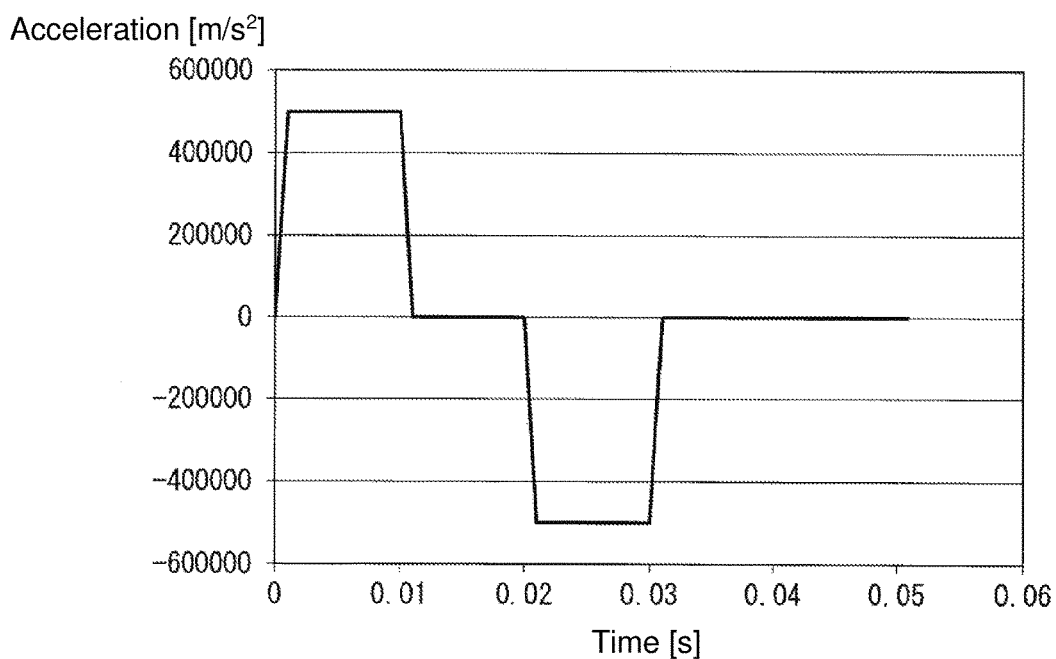
FIG. 5 is a view illustrating the position instruction generated with the conveying device of the first embodiment.

FIG. 5 is a view illustrating the position instruction. In FIG. 5, a horizontal axis indicates time [s] and a vertical axis indicates acceleration [m/s$^2$].

For example, a magnitude of an effective torque of the motor is determined in order to determine a magnitude of the motor load. The effective torque can be obtained as follows.

Effective torque=√((positive-side maximum torque$^2$× acceleration time+negative-side maximum torque$^2$×deceleration time)/traveling time)

Assuming that T is a torque, that J is total load inertia of conversion in terms of motor shaft, and that w is motor angular velocity, the torque is obtained as follows.

$$\begin{aligned}T &= J \cdot d\omega/dt \\ &= J \times \text{acceleration of each motor} \\ &= J \times \text{conversion factor from position instruction unit to motor angle} \times \\ &\quad \text{position instruction acceleration}\end{aligned}$$

A proportional relationship holds between the torque and the position instruction acceleration. Therefore, a magnitude correlation of the effective torque can be determined by checking an effective value (effective acceleration) of the position instruction acceleration. That is, the effective acceleration indicates a motor load ratio.

A calculation formula of the effective acceleration can be obtained as follows.

Effective acceleration=√((maximum acceleration$^2$× acceleration time+maximum deceleration$^2$×deceleration time)/traveling time)

When the calculation formula of the effective acceleration is used, the conditional expression 2 is better than the conditional expression 1 in the motor load reduction effect.

Each conditional expression is an expression, which calculates the parameter generating the position instruction that can suppress the vibration of the identical vibration control frequency f. The conditional expressions differ from each other in the calculated parameter. A degree suitable for each control performance condition varies according to the calculated parameter. Therefore, depending on each control performance condition, the priority of the conditional expression is previously decided according to the degree suitable for the control performance condition.

Specifically, as a total shortest traveling time from the acceleration start to the deceleration end is shortened when the conditional expression is satisfied, the shortest traveling time is more suitable for the control performance condition prioritizing the target traveling time. Therefore, the priority is given to the shortest traveling time in the ascending order with respect to the control performance condition prioritizing the target traveling time.

On the other hand, as the effective acceleration decreases, the effective acceleration is more suitable for the control performance condition prioritizing the motor load ratio reduction. Therefore, the priority is given to the effective acceleration in the ascending order with respect to the control performance condition prioritizing the motor load ratio reduction. When the user inputs the control performance condition, one of the plural conditional expressions is selected. When the user inputs as the machine performance conditions such as the target traveling distance, the target traveling time, and the resonance frequency, T1, T2, and the acceleration that are the parameters of the selected conditional expression are calculated in order to generate the position instruction, which satisfies each machine performance condition or is closest to the machine performance condition. The position instruction is generated based on the parameter.

Assuming that L is a traveling distance, that T is a traveling time, that f is a vibration control frequency, and that A is acceleration, parameters T1, T2, and A can be calculated by (equation 1) or (equation 2) and the following equations.

$$V \times (T1) + V \times (T2) = L$$

$$A = V/T1$$

$$V = L/T$$

$$2 \times (T1) + (T2) = T$$

The conditional expression is not limited to the conditional expressions 1 and 2. Alternatively, a conditional expression obtained by (equation 3) in Japanese Patent No. 4601659 and a conditional expression obtained by (equation 5) may be stored. In (equation 3), "r" is a parameter, and is obtained by (equation 4).

[Mathematical formula 1]

$$A*(t) = \begin{cases} c \times \cos\left(\frac{\pi}{2}\frac{r}{t_0}t\right) & (0 \leq t \leq t_0) \\ -c \times \cos\left(\frac{\pi}{2}\frac{r}{t_0}(2t_0 - t)\right) & (t_0 \leq t \leq 2t_0) \\ 0 & (\text{otherwise}) \end{cases} \quad \text{(equation 3)}$$

[Mathematical formula 2]

$$r = \pm 2\left(\frac{\omega t_0}{\pi} - 2m\right) \quad \text{(equation 4)}$$

[Mathematical formula 3]

$$Ap = D/t_0^2 \times 1/(1-r) \quad \text{(equation 5)}$$

For the conditional expression except for the conditional expressions 1 and 2, the priority may be given to the control performance condition prioritizing the target traveling time according to the total shortest traveling time from the acceleration start to the deceleration end in satisfying the conditional expression at a certain vibration control frequency f.

The priority may be given to the control performance condition prioritizing the motor load ratio reduction according to the effective acceleration satisfying the conditional expression at a certain vibration control frequency f.

(Schematic Processing Flow of Instruction Generator 10)

Figure 6:
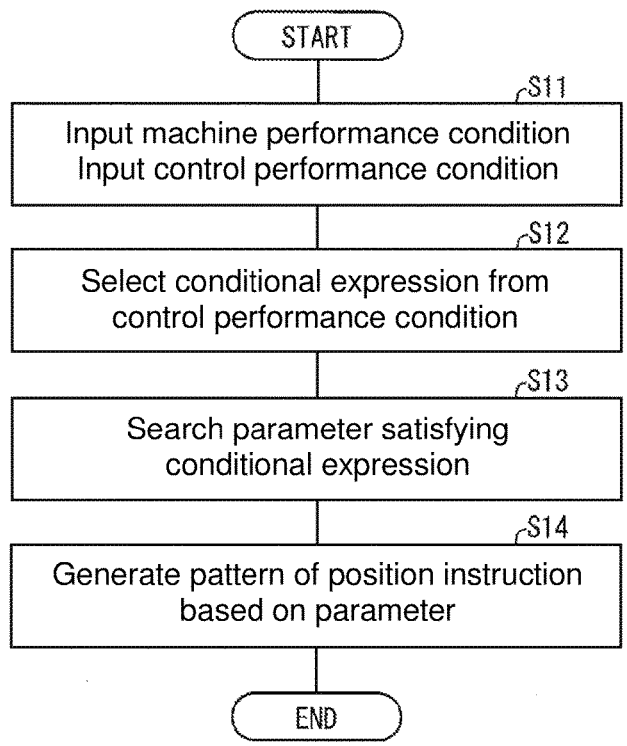
FIG. 6 is a flowchart illustrating processing performed with an instruction generator included in the conveying device of the first embodiment.

FIG. 6 is a flowchart illustrating the processing performed with the instruction generator 10 according to the first embodiment of the present invention. As illustrated in FIG. 6, when the user inputs the machine performance condition and the control performance condition to the controller 2, the receiver 11 of the instruction generator 10 receives the machine performance condition and the control performance condition (step S11).

The conditional expression selector 13 refers to the storage 12 to select the conditional expression having the highest priority corresponding to the input control performance condition (step S12).

The parameter calculator 14 decides the parameter satisfying the conditional expression selected with the conditional expression selector 13 (step S13).

The position instruction generator 15 generates a pattern of the position instruction based on the parameter decided in step S13 (step S14). The position instruction generator 15 outputs the generated position instruction to the driver.

(Processing Flow in which Priority is Given to Target Traveling Time)

A specific flow of the processing performed with the instruction generator 10 in inputting the control performance condition prioritizing the target traveling time will be described below.

Figure 11:
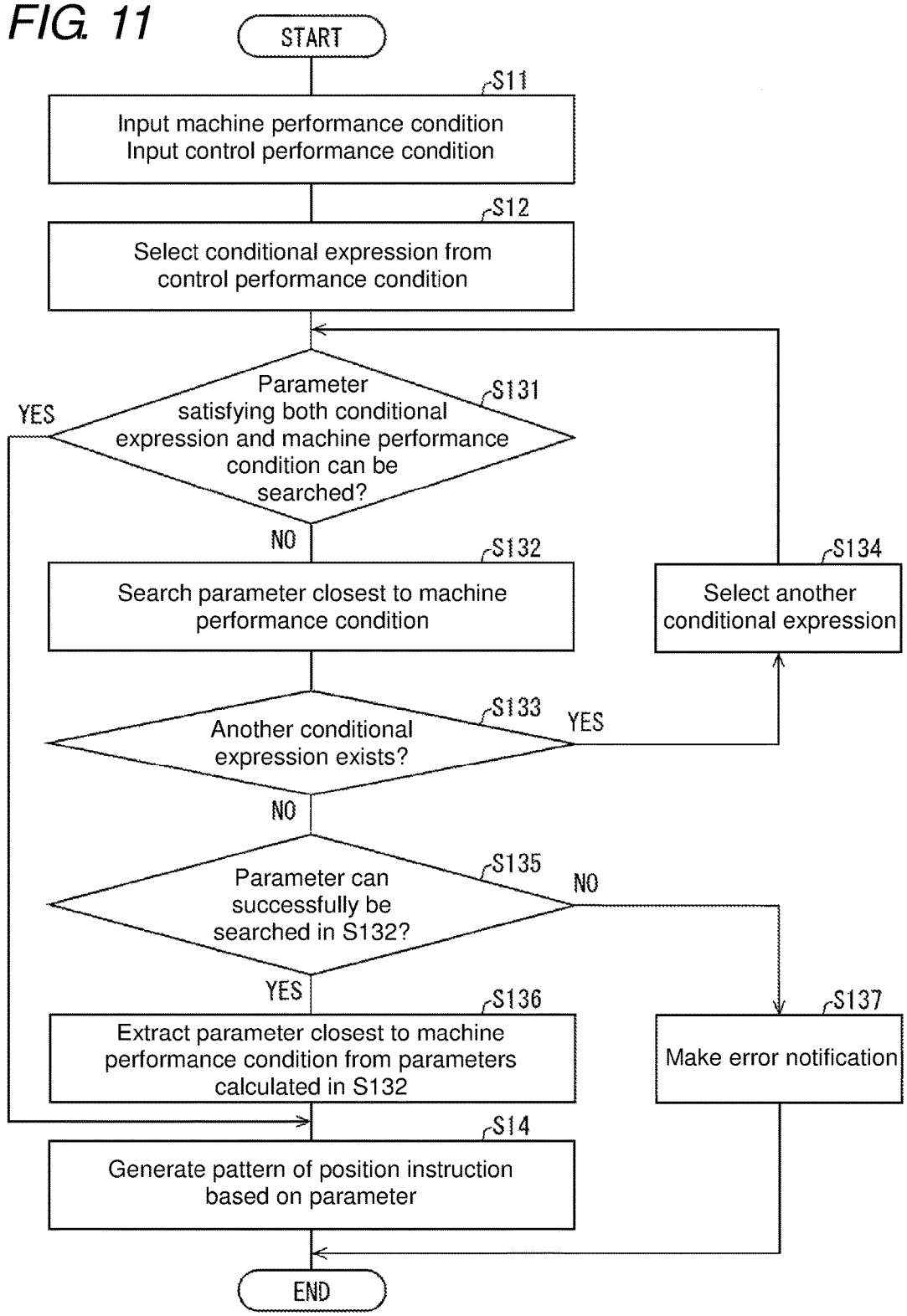
FIG. 11 is a flowchart illustrating processing performed with the instruction generator when a control performance condition prioritizing a target traveling time is input.

FIG. 11 is a flowchart illustrating the processing performed with the instruction generator 10 when the control performance condition prioritizing the target traveling time is input. In FIG. 11, steps S131 to S137 indicate the detailed processing in step S13 of FIG. 6.

In this case, in step S12, the conditional expression selector 13 refers to the storage 12 to select the conditional expression having the highest priority corresponding to the control performance condition prioritizing the target traveling time. For example, in the case that the conditional expression and priority in FIG. 2 are stored in the storage 12, the conditional expression selector 13 selects the conditional expression 2 having the priority "1" corresponding to the control performance condition prioritizing the target traveling time.

The parameter calculator 14 checks whether the parameter satisfying both the conditional expression selected with the conditional expression selector 13 and the machine performance condition can be calculated (step S131). At this point, the parameters are T1, T2, A, and n as described above.

When the parameter calculator 14 can calculate the parameter satisfying both the conditional expression and the machine performance condition (YES in step S131), the processing in step S13 is ended, and the flow proceeds to step S14.

On the other hand, in step S131, when the parameter calculator 14 hardly calculates the parameter satisfying both the conditional expression and the machine performance condition (NO in step S131), the parameter calculator 14 calculates the parameter, which satisfies the selected conditional expression and machine performance condition (however, the target traveling time is excluded) and is closest to the target traveling time, within a predetermined range less than or equal to upper limits of velocity, acceleration, and deceleration (step S132). In the case that the parameter satisfying the selected conditional expression and machine performance condition (however, the target traveling time is excluded) is hardly calculated, the flow directly proceeds to the next step.

Then, the conditional expression selector 13 refers to the storage 12 to determine whether the conditional expression different from the already-selected conditional expression is stored in the storage 12 (step S133).

When determining that the conditional expression different from the already-selected conditional expression is stored in the storage 12 (YES in step S133), the conditional expression selector 13 selects the different conditional expression (step S134). In the case that the plural conditional expressions different from the already-selected conditional expression are stored in the storage 12, the conditional expression selector 13 selects the conditional expression having the second highest priority corresponding to the input control performance condition in the plural conditional expressions. Then, the pieces of processing from step S131 are performed again.

For example, in the case that only the conditional expression 2 is already selected while the conditional expression and priority in FIG. 2 are stored in the storage 12, the conditional expression selector 13 selects the conditional expression 1 having the priority "2" corresponding to the control performance condition prioritizing the target traveling time.

In step S134, when the conditional expression selector 13 determines that the conditional expression different from the already-selected conditional expression is not stored in the storage 12 (NO in step S133), the parameter calculator 14 checks whether the parameter calculated in step S132 exists with respect to the already-selected conditional expression (step S135).

In step S135, when the parameter does not exist (NO in step S135), the instruction generator 10 makes an error notification (step S137) to end the processing.

In step S135, when the parameter exists (YES in step S135), the parameter calculator 14 extracts the parameter closest to the target traveling time from the parameters calculated in step S132 (step S136). The processing in step S14 is performed based on the extracted parameter.

(Processing Flow in which Priority is Given to Motor Load Reduction)

A specific flow of the processing performed with the instruction generator 10 in inputting the control performance condition prioritizing the motor load reduction will be described below.

Figure 12:
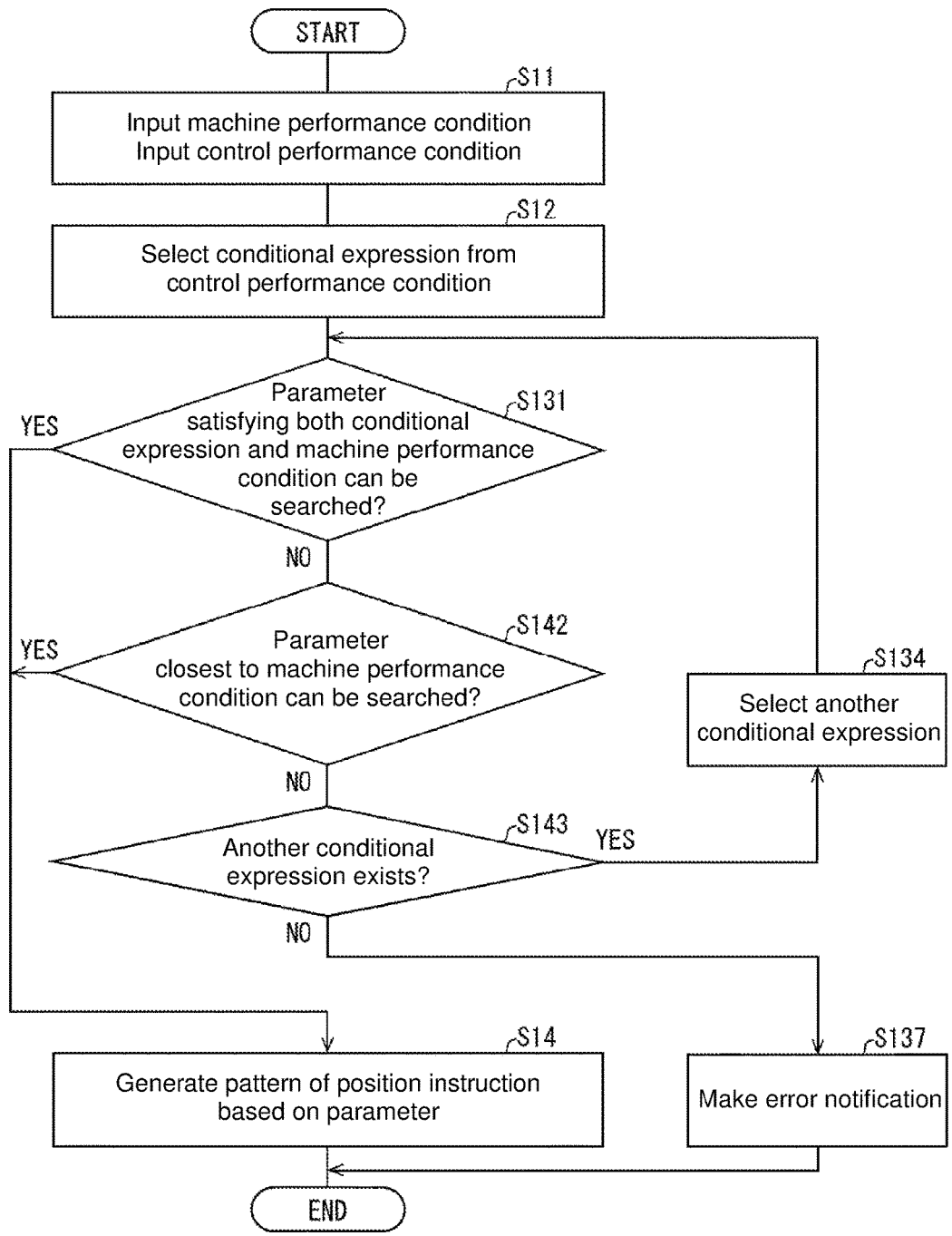
FIG. 12 is a flowchart illustrating processing performed with the instruction generator when the control performance condition prioritizing motor load reduction is input.

FIG. 12 is a flowchart illustrating the processing performed with the instruction generator 10 when the control performance condition prioritizing the motor load reduction is input. In FIG. 12, steps S131, S134, S137, S142, and S143 indicate the detailed processing in step S13 of FIG. 6.

In this case, in step S12, the conditional expression selector 13 refers to the storage 12 to select the conditional expression having the highest priority corresponding to the control performance condition prioritizing the motor load reduction (step S12). For example, in the case that the conditional expression and priority in FIG. 2 are stored in the storage 12, the conditional expression selector 13 selects the conditional expression 1 having the priority "1" corresponding to the control performance condition prioritizing the motor load reduction.

The parameter calculator 14 checks whether the parameter (T1, T2, A, and n) satisfying both the conditional expression selected with the conditional expression selector 13 and the machine performance condition can be calculated (step S131).

When the parameter calculator 14 can calculate the parameter satisfying both the conditional expression and the machine performance condition (YES in step S131), the processing in step S13 is ended, and the flow proceeds to the processing in step S14 based on the parameter.

On the other hand, in step S131, when the parameter calculator 14 hardly calculates the parameter satisfying both the conditional expression and the machine performance condition (NO in step S131), the parameter calculator 14 checks whether the parameter, which satisfies the selected conditional expression and machine performance condition (however, the target traveling time is excluded) and is closest to the target traveling time, can be calculated within a predetermined range less than or equal to upper limits of velocity, acceleration, and deceleration (step S142).

In step S142, when the parameter can be calculated (YES in step S142), the processing in step S13 is ended, and the processing in step S14 is performed based on the parameter.

In step S142, when the parameter is hardly calculated (NO in step S142), the conditional expression selector 13 refers to the storage 12 to check whether the conditional expression different from the already-selected conditional expression is stored in the storage 12 (step S143).

When determining that the conditional expression different from the already-selected conditional expression is stored in the storage 12 (YES in step S143), the conditional expression selector 13 selects the different conditional expression (step S134). In the case that the plural conditional expressions different from the already-selected conditional expression are stored in the storage 12, the conditional expression selector 13 selects the conditional expression having the second highest priority corresponding to the input control performance condition from the plural conditional expressions. Then, the pieces of processing from step S131 are performed again.

For example, in the case that only the conditional expression 1 is already selected while the conditional expression and priority in FIG. 2 are stored in the storage 12, the conditional expression selector 13 selects the conditional expression 2 having the priority "2" corresponding to the control performance condition prioritizing the target traveling time.

In step S143, when the conditional expression selector 13 determines that the conditional expression different from the already-selected conditional expression is not stored in the storage 12 (NO in step S143), the instruction generator 10 makes an error notification (step S137) to end the processing.

(Processing Flow in which Priority is Given to Both Motor Load Reduction and Target Traveling Time)

A specific flow of the processing performed with the instruction generator 10 in inputting the control performance condition prioritizing both the motor load ratio reduction and the position instruction closest to the target traveling time will be described below. That is, the third control performance condition is input. In the third control performance condition, the first control performance condition prioritizing the target traveling time and the second control performance condition prioritizing motor load reduction are combined. In this case, because the processing similar to that in FIG. 11 is performed, the description will be made with reference to FIG. 11.

The conditional expression selector 13 refers to the storage 12 to select the conditional expression having the highest priority corresponding to the control performance condition prioritizing the motor load reduction (step S12).

The parameter calculator 14 checks whether the parameter satisfying both the conditional expression selected with the conditional expression selector 13 and the machine performance condition can be calculated (step S131).

When the parameter calculator 14 can calculate the parameter satisfying both the conditional expression and the machine performance condition (YES in step S131), the processing in step S13 is ended, and the flow proceeds to step S14.

In step S131, on the other hand, when the parameter calculator 14 hardly calculates the parameter satisfying both the conditional expression and the machine performance condition (NO in step S131), the parameter calculator 14 calculates the parameter, which satisfies the selected conditional expression and machine performance condition (however, the target traveling time is excluded) and is closest to the target traveling time, within a predetermined range less than or equal to upper limits of velocity, acceleration, and deceleration (step S132). In the case that the parameter satisfying the selected conditional expression and machine performance condition (however, the target traveling time is excluded) is hardly calculated, the flow directly proceeds to the next step.

Then, the conditional expression selector 13 refers to the storage 12 to determine whether the conditional expression different from the already-selected conditional expression is stored in the storage 12 (step S133).

When determining that the conditional expression different from the already-selected conditional expression is stored in the storage 12 (YES in step S133), the conditional expression selector 13 selects the different conditional expression (step S134). In the case that the plural conditional expressions different from the already-selected conditional expression are stored in the storage 12, the conditional expression selector 13 selects the conditional expression having the second highest priority corresponding to the control performance condition prioritizing the motor load reduction from the plural conditional expressions. Then, the pieces of processing from step S131 are performed again.

When the conditional expression selector 13 determines that the conditional expression different from the already-selected conditional expression is not stored in the storage 12 (NO in step S133), the parameter calculator 14 checks whether the parameter calculated in step S132 exists with respect to the already-selected conditional expression (step S135).

In step S135, when the parameter does not exist (NO in step S135), the instruction generator 10 makes an error notification (step S137) to end the processing.

In step S135, when the parameter exists (YES in step S135), the parameter calculator 14 extracts the parameter closest to the target traveling time from the parameters calculated in step S132 (step S136). The processing in step S14 is performed based on the extracted parameter.

(Specific Example of Position Instruction)

Figure 7:
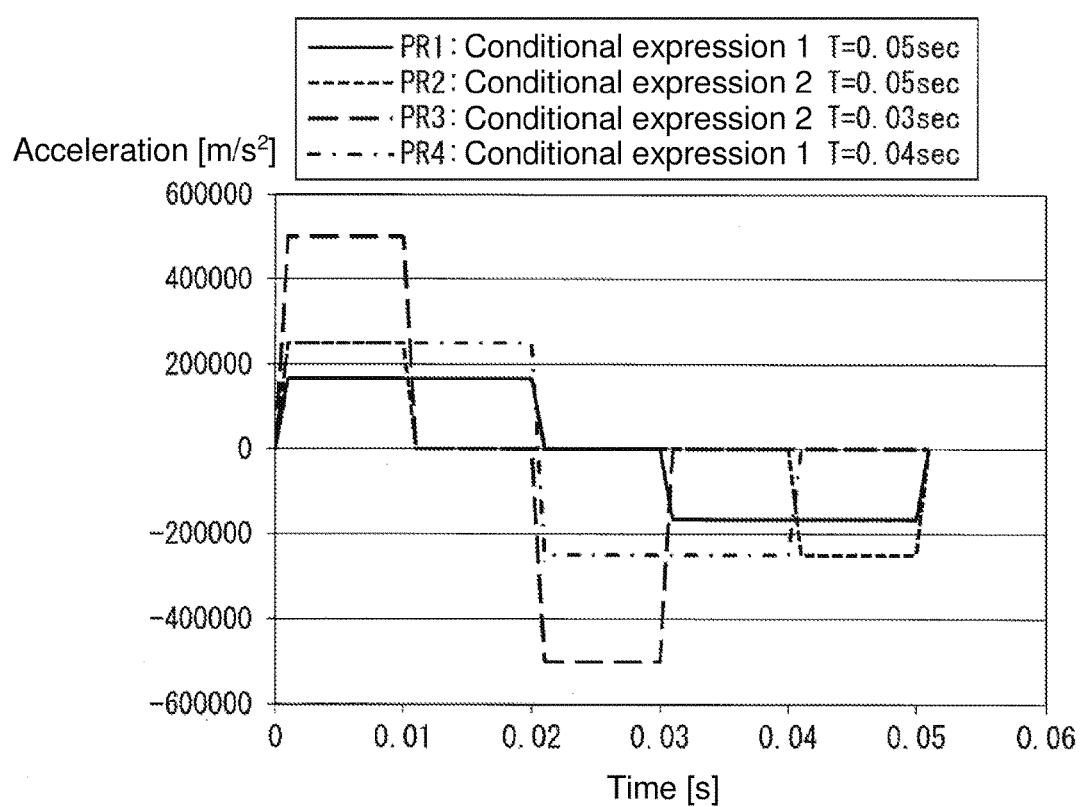
FIG. 7 is a view illustrating a specific example of the position instruction generated with the instruction generator included in the conveying device of the first embodiment.

FIG. 7 is a view illustrating an example of the position instruction generated with the instruction generator 10 of the controller 2. In FIG. 7, the horizontal axis indicates time [s] and the vertical axis indicates acceleration [m/s$^2$].

<The Case that Position Instruction Prioritizing Target Traveling Time is Generated>

As described above, first the parameter satisfying both the conditional expression and machine performance condition, which have the highest priority corresponding to the control performance condition prioritizing the target traveling time, is searched and decided. Unless the parameter is searched and decided, the parameter satisfying both the conditional expression and machine performance condition, which have the second highest priority, is searched.

EXAMPLE 1

In the case that target traveling time T=0.05 [s], traveling distance L=100 [m], and vibration control frequency f=50 [Hz] are input as the machine performance condition while the conditional expressions 1 and 2 in FIG. 2 are stored in the storage 12, a profile PR2 of the conditional expression 2 is generated as the position instruction.

Specifically, because of target traveling time T=0.05 [s] and vibration control frequency f=50 [Hz], the use of (equation 2) leads to T1+T2=0.02 [s]×n from T1+T2=n/f.

T1=0.01 [s], T2=0.03 [s], and n=2 are calculated as the parameter of the profile PR2, thereby obtaining T1+T2=0.04.

At this point, n=1 is not calculated as the parameter. This is attributed to the following reason. That is, the vibration control condition is satisfied on the assumption that the acceleration period (T1) and the deceleration period (T1) are equal to each other with the constant-velocity period (T2) interposed therebetween. However, for n=1, namely, T1+T2=0.02 [s] and T=0.05 [s], the acceleration period (T1) and the deceleration period (T1) are not equal (symmetrical) to each other with the constant-velocity period (T2) interposed therebetween.

EXAMPLE 2

In the case that target traveling time T=0.03 [s], traveling distance L=100 [m], and vibration control frequency f=50 [Hz] are input as the machine performance condition while the conditional expressions 1 and 2 in FIG. 2 are stored in the storage 12, a profile PR3 of the conditional expression 2 is generated as the position instruction.

T1=0.01 [s], T2=0.01 [s], and n=1 are calculated as the parameter of the profile PR3, thereby obtaining T1+T2=0.02.

In the case that the conditional expression 1 is selected, the parameters satisfying all the machine performance conditions in (Example 2) are hardly calculated. Because of T1=n/f=0.02 from (equation 1), the shortest traveling time of the conditional expression 1 is 0.04 (T1×2, T2=0). However, because of T=0.03, the given machine performance condition is not satisfied.

<The Case that Position Instruction Prioritizing Motor Load Reduction is Generated>

As described above, the parameter satisfying both the conditional expression and machine performance condition, which have the highest priority corresponding to the control performance condition prioritizing the motor load reduction, is searched and decided. Unless the parameter is searched and decided, the parameter satisfying both the conditional expression and machine performance condition (however, the target traveling time is excluded), which have the highest priority, is searched. Even if the parameter is hardly decided, the parameter is searched using the conditional expression having the second highest priority.

EXAMPLE 3

In the case that target traveling time T=0.05 [s], traveling distance L=100 [m], and vibration control frequency f=50 [Hz] are input as the machine performance condition while the conditional expressions 1 and 2 in FIG. 2 are stored in the storage 12, a profile PR1 of the conditional expression 1 is generated as the position instruction.

T1=0.02 [s], the constant-velocity period (T2)=0.01 [s], and n=1 are calculated as the parameter of the profile PR1.

EXAMPLE 4

In the case that target traveling time T=0.03 [s], traveling distance L=100 [m], and vibration control frequency f=50 [Hz] are input as the machine performance condition while the conditional expressions 1 and 2 in FIG. 2 are stored in the storage 12, a profile PR4 of the conditional expression 1 is generated as the position instruction.

T1=0.02 [s], T2=0 [s], and n=1 are calculated as the parameter of the profile PR4. At this point, in the profile PR4, the traveling time (T1×2) to which the acceleration period and the deceleration period are added is 0.04 [s], and exceeds T=0.03. In the conditional expression 1, the position instruction in which the motor load ratio is reduced while the vibration control condition is satisfied can be generated although the traveling time is slightly sacrificed.

That is, even in the case that the parameter calculator 14 hardly calculates the parameter of the conditional expression 1 satisfying both the machine performance condition and the target traveling time, the parameter closest to the target traveling time is calculated within the range less than or equal to the upper limits of the velocity, acceleration, and deceleration.

<The Case that Position Instruction Prioritizing Motor Load Reduction and Target Traveling Time is Generated>

As described above, the parameter satisfying both the conditional expression and machine performance condition, which have the highest priority corresponding to the control performance condition prioritizing the motor load reduction, is searched and decided. Unless the parameter is searched and decided, the parameter satisfying both the conditional expression and machine performance condition, which have the second highest priority, is searched.

EXAMPLE 5

In the case that target traveling time T=0.05 [s], traveling distance L=100 [m], and vibration control frequency f=50 [Hz] are input as the machine performance condition, the profile PR1 of the conditional expression 1 is generated as the position instruction.

EXAMPLE 6

In the case that target traveling time T=0.03 [s], traveling distance L=100 [m], and vibration control frequency f=50

[Hz] are input as the machine performance condition, the profile PR3 of the conditional expression 2 is generated as the position instruction.

In (Example 6), the profile PR2 is generated using not the conditional expression 1 but the conditional expression 2. This is because the shortest traveling time of 0.04 [s] of the conditional expression 1 does not satisfy the target traveling time T=0.03 [s].

Thus, when the optimum conditional expression is selected, the position instruction closer to the machine performance condition can be generated while the desired control performance condition of the user is satisfied.

Figure 8:
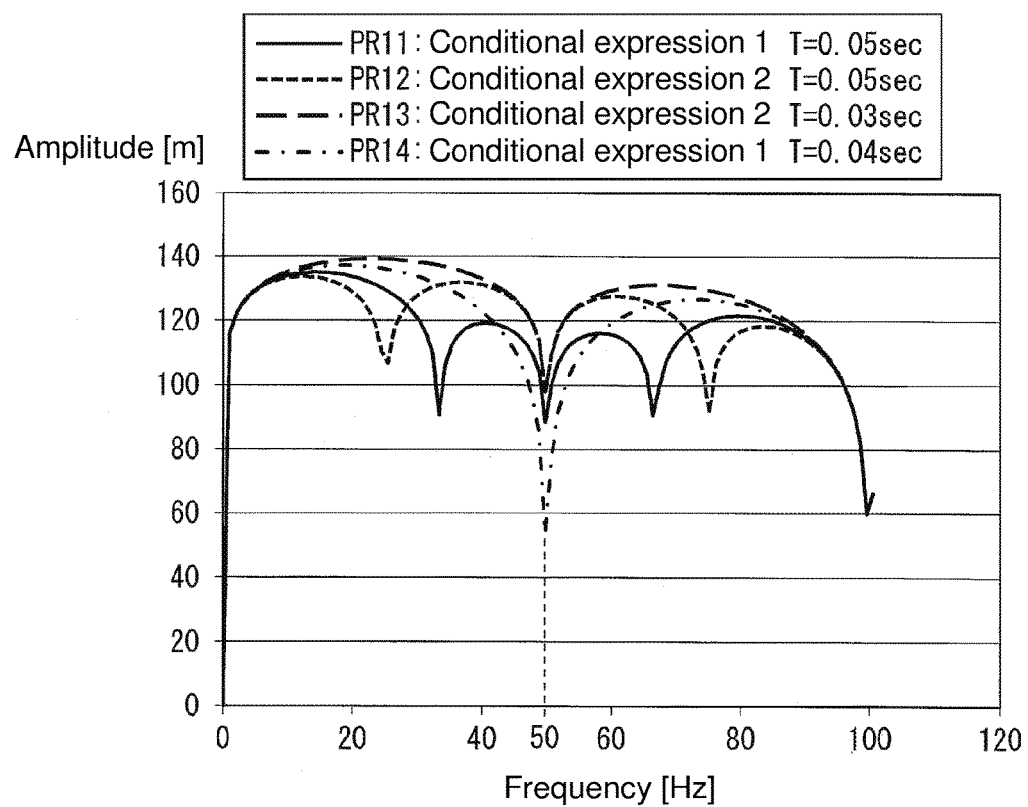
FIG. 8 is a view illustrating a result in which an acceleration component is analyzed using a frequency with respect to each profile of the position instruction shown in FIG. 7.

FIG. 8 is a view illustrating a result in which an acceleration component is analyzed using the frequency with respect to each profile of the position instruction in FIG. 7. In FIG. 8, the horizontal axis indicates a frequency [Hz] and the vertical axis indicates amplitude [m].

Profiles PR11 to PR14 in FIG. 8 correspond to the profiles PR1 to 4 in FIG. 7, respectively. In the profiles PR11 to 14 of FIG. 8, the amplitude falls at the frequency of 50 [Hz] that is the vibration control frequency, the amplitude of the vibration at the frequency of 50 [Hz] can be expected to be reduced.

Second Embodiment

A second embodiment of the present invention will be described below with reference to FIGS. 9 and 10. For convenience of explanation, the member having the same function as the first embodiment is designated by the same numeral as the first embodiment, and the description is omitted.

Figure 9:
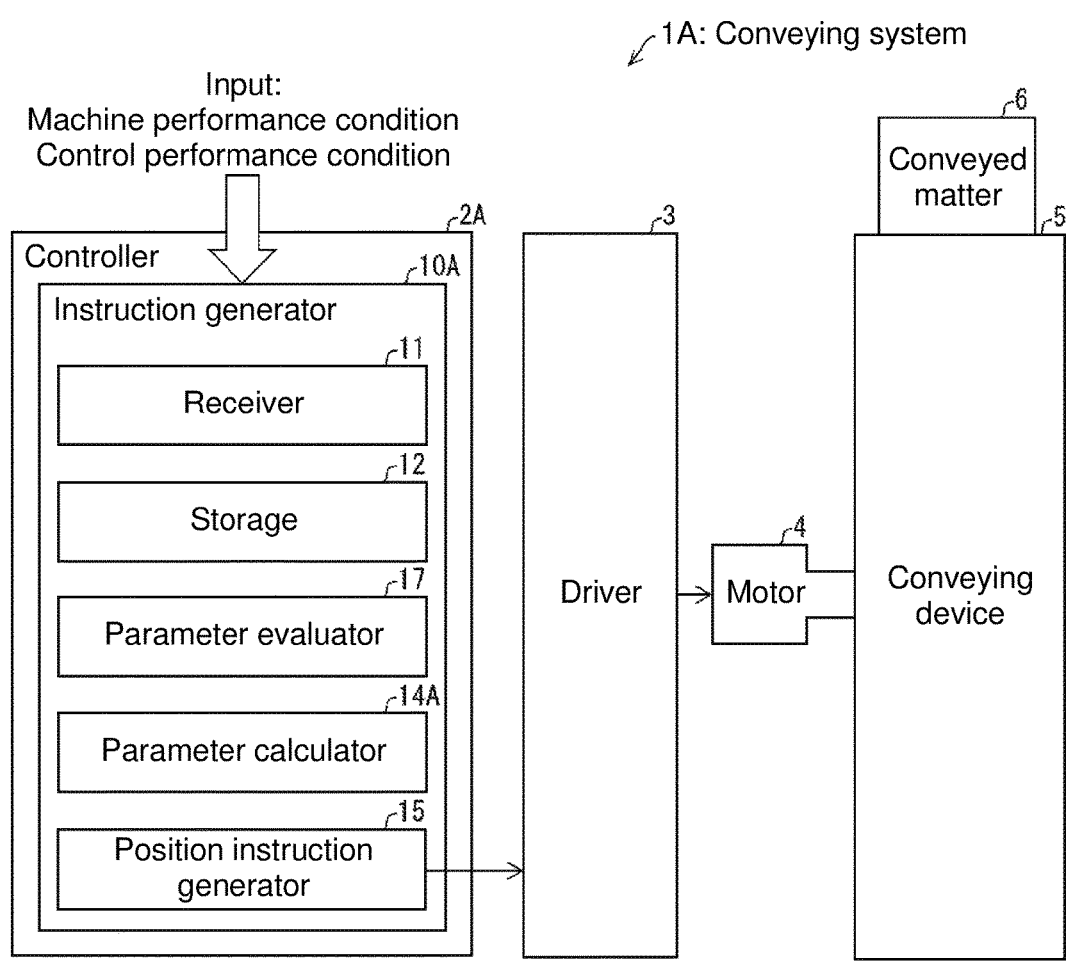
FIG. 9 is a view illustrating a configuration of a conveying device according to a second embodiment of the present invention.

FIG. 9 is a view illustrating a configuration of a conveying system 1 A of the second embodiment of the present invention. The conveying system 1A differs from the conveying system 1 in that the conveying system 1 A includes a controller (instruction generating device) 2A instead of the controller 2 of the conveying system 1. The controller 2A differs from the controller 2 in that the controller 2A includes an instruction generator 10A instead of the instruction generator 10. Other configurations of the conveying system 1 A are similar to those of the conveying system 1.

The instruction generator 10A includes the receiver 11, the storage 12, a parameter evaluator 17, a parameter calculator 14A, and the position instruction generator 15.

Plural conditional expressions, for example, (equation 1) and (equation 2) or a conditional expression obtained by (equation 3) and a conditional expression obtained by (equation 5) are stored in the storage 12. In (equation 3), "r" is a parameter, and is obtained by (equation 4).

[Mathematical formula 1]

$$A*(t) = \begin{cases} c \times \cos\left(\frac{\pi}{2}\frac{r}{t_0}t\right) & (0 \leq t \leq t_0) \\ -c \times \cos\left(\frac{\pi}{2}\frac{r}{t_0}(2t_0 - t)\right) & (t_0 \leq t \leq 2t_0) \\ 0 & (\text{otherwise}) \end{cases} \quad \text{(equation 3)}$$

[Mathematical formula 2]

$$r = \pm 2\left(\frac{\omega t_0}{\pi} - 2m\right) \quad \text{(equation 4)}$$

[Mathematical formula 3]

$$Ap = D/t_0^2 \times 1/(1-r) \quad \text{(equation 5)}$$

In the second embodiment, unlike the above description made with reference to FIG. 2, the priority corresponding to control performance condition is not given to each conditional expression stored in the storage 12.

In the second embodiment, the instruction generator 10A searches the parameter with respect to all the conditional expressions stored in the storage 12, thereby obtaining a solution candidate (position instruction candidate). Then, the instruction generator 10A selects the parameter satisfying the machine performance condition or the parameter closest to the machine performance condition from all the solution candidates according to the index of the input control performance condition, and generates the position instruction.

(Schematic Processing Flow of Instruction Generator 10A)

Figure 10:
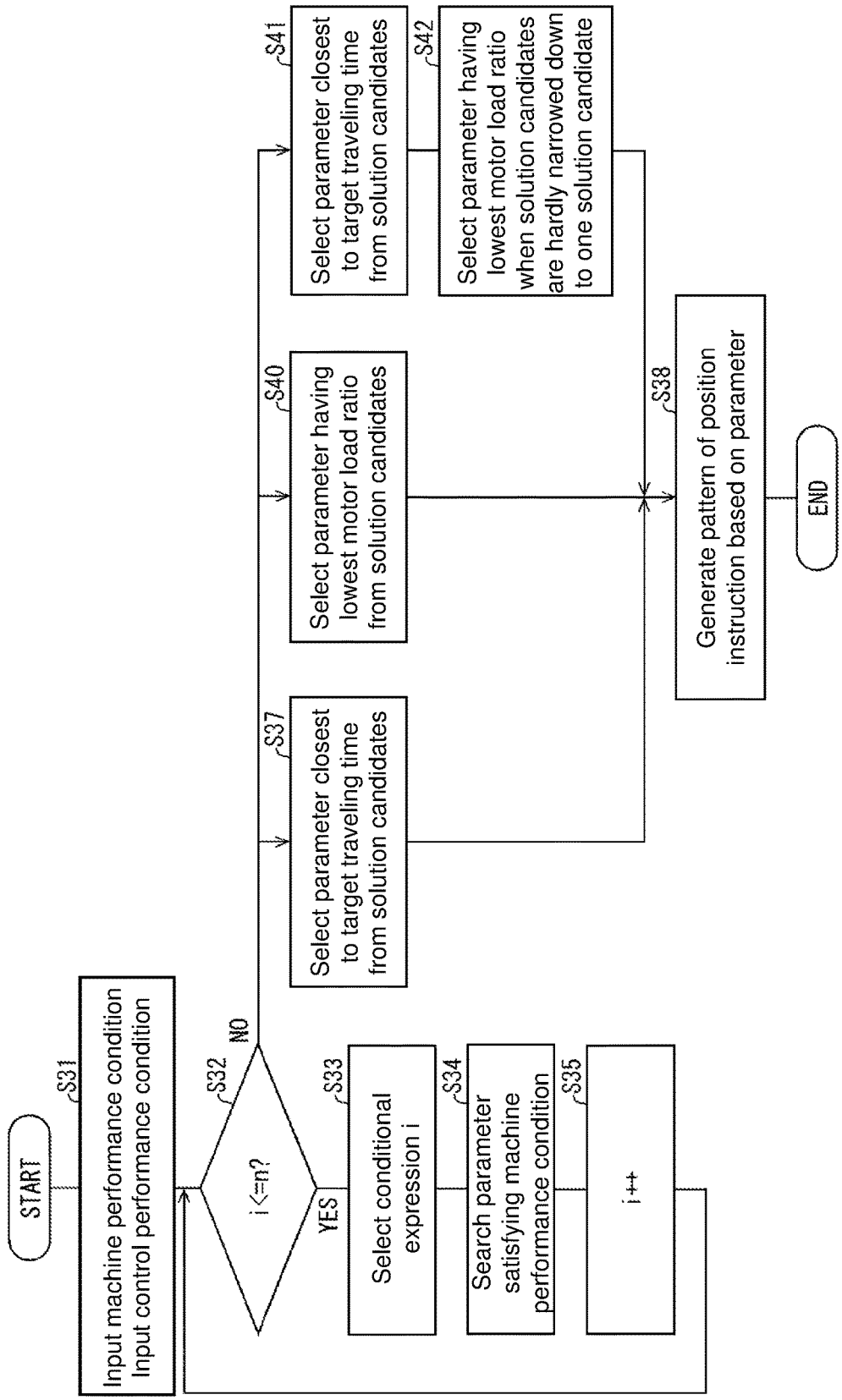
FIG. 10 is a flowchart illustrating processing performed with an instruction generator according to the second embodiment of the present invention.

FIG. 10 is a flowchart illustrating the processing performed with the instruction generator 10A of the second embodiment of the present invention.

As illustrated in FIG. 10, when the user inputs the machine performance condition and the control performance condition to the controller 2, the receiver 11 of the instruction generator 10A receives the machine performance condition and the control performance condition (step S31).

In steps S32 to S35, the parameter calculator 14A searches the parameter (T1, T2, and A) necessary to uniquely decide the position instruction with respect to all the conditional expressions stored in the storage 12, and holds a calculation result of the conditional expression obtained by the search as the solution candidate (position instruction candidate).

Specifically, first the parameter calculator 14A determines whether i (i is a variable) is less than or equal to n (n is the number of conditional expressions stored in the storage 12) (step S32).

When i is less than or equal to n in step S32 (YES in step S32), the parameter calculator 14A selects the conditional expression in which the parameter is not searched yet from the conditional expressions stored in the storage 12 (step S33). The parameter calculator 14A sets the calculation result, which is obtained by searching the parameter of the conditional expression selected in step S33, to the solution candidate (step S34). The parameter calculator 14A increments the variable i (step S35). Then, the flow returns to the processing in step S32.

In step S32, when i is larger than n (NO in step S32), when the parameter calculator 14A ends the search of the parameter with respect to all the conditional expressions, the next processing depends on which one of the first to third control performance conditions is input as the control performance condition.

In the case that the first control performance condition (the target traveling time is prioritized) is input as the control performance condition, after the negative determination in step S32, the parameter evaluator 17 selects the parameter satisfying the target traveling time from the plural solution candidates held with the parameter calculator 14A. In the case that the parameter satisfying the target traveling time does not exist, the parameter closest to the target traveling time is selected (step S37).

In the case that the plural parameters satisfying the target traveling time exist, the parameter evaluator 17 selects any one of the parameters.

When the parameter calculator 14A selects the parameter, the position instruction generator 15 generates the pattern of the position instruction based on the parameter (step S38). The position instruction generator 15 outputs the generated position instruction to the driver.

In the case that the second control performance condition (the motor load reduction is prioritized) is input as the control performance condition, after the negative determination in step S32, the parameter evaluator 17 selects the parameter having the lowest motor load ratio from the plural solution candidates held with the parameter calculator 14A (step S40). Specifically, the parameter evaluator 17 calculates the effective acceleration with respect to each of the plural solution candidates held with the parameter calculator 14A. As described above, the effective acceleration is the value indicating the motor load ratio. The parameter evaluator 17 selects the parameter having the lowest effective acceleration. Then, the flow proceeds to the processing in step S38.

In the case that the third control performance condition (both the motor load reduction and the target traveling time are prioritized) is input as the control performance condition, after the negative determination in step S32, the parameter evaluator 17 selects the parameter closest to the target traveling time from the plural solution candidates held with the parameter calculator 14A (step S41). In the case that the parameter evaluator 17 hardly narrows down the plural solution candidates into one solution candidate, the parameter evaluator 17 calculates the effective acceleration with respect to each of the plural solution candidates. The parameter evaluator 17 selects the parameter having the lowest effective acceleration from the plural solution candidates (step S42).

Then, the flow proceeds to the processing in step S38.

Thus, the plural conditional expressions, each of which calculates the parameter of the position instruction suppressing the vibration of the conveying device 5 based on the machine performance condition, are stored in the storage 12 of the instruction generator 10A.

Based on the control performance condition, the parameter evaluator 17 evaluates the parameter calculated with the parameter calculator 14A. The position instruction generator 15 generates the position instruction based on the parameter most highly evaluated with the parameter evaluator 17.

Therefore, the position instruction, which satisfies the machine performance condition or is close to the machine performance condition, can be generated according to the designated control performance condition (first to third control performance conditions).

Therefore, the position instruction matched with the desired control performance condition of the user can be generated even if the plural position instructions satisfying the vibration control condition exist.

Implementation Example by Software

The control block (particularly, the instruction generator 10) of the controller 2 may be constructed with a logic circuit (hardware) formed in an integrated circuit (IC chip), or implemented by software using the CPU (Central Processing Unit).

In the latter, the controller 2 includes the CPU that executes a command of the program that is of software implementing each function, the ROM (Read Only Memory) or storage device (referred to as a "recording medium") in which the program and various pieces of data are readably stored by the computer (CPU), and the RAM (Random Access Memory) in which the program is expanded. The computer (or the CPU) reads the program from the recording medium to execute the program, thereby achieving the object of the present invention. A "non-transient physical medium" such as a tape, a disk, a card, a semiconductor memory, and a programmable logic circuit can be used as the recording medium. The program may be supplied to the computer through any transmission medium, such as a communication network and a broadcasting wave, which can transmit the program. The present invention can be implemented even in a mode of a data signal. The data signal is embedded in a carrier wave, and the program is provided by electronic transmission in the data signal.

The present invention is not limited to the embodiments, but various changes can be made without departing from the scope of the present invention. It is noted that the embodiment obtained by a combination of different embodiments is also included in the scope of the present invention.

For example, in the embodiments, the controllers 2 and 2A are configured as the instruction generating device by way of example. Alternatively, the instruction generators 10 and 10A are incorporated in the driver 3, and the driver 3 may function as the instruction generating device. In the instruction generators 10 and 10A, the position instruction generator 15 is accommodated in a first casing (for example, the driver 3), other functional parts (11, 12, 13, 14) are accommodated in a second casing (for example, the controller 2), and the instruction generating device may be constructed with the first and second casings.

The invention claimed is:

1. An instruction generating device that generates a position instruction of instruction information to drive a machine, the instruction generating device comprising:
   a receiver that receives an input of a machine performance index comprising at least a target traveling distance, a target traveling time, and a resonance frequency of a vibration to become a vibration control target;
   a storage in which a plurality of vibration control conditional expressions are stored, the plurality of vibration control conditional expressions calculating a parameter of the position instruction suppressing the vibration based on the machine performance index; and
   a processor configured with a program to perform operations comprising:
   operation as a conditional expression selector configured to select a vibration control conditional expression to generate the position instruction from the plurality of vibration control conditional expressions based on a control performance index indicating an item to be prioritized during drive control of the machine;
   operation as a parameter calculator configured to calculate the parameter based on the machine performance index and the selected vibration control conditional expression; and
   operation as a position instruction generator configured to calculate the position instruction based on the parameter calculated with the parameter calculator.

2. The instruction generating device according to claim 1, wherein the receiver receives the input of the control performance index, and
   the processor is configured with the program to perform operations such that the conditional expression selector is further configures to select the vibration control conditional expression based on the control performance index received with the receiver.

3. The instruction generating device according to claim 1, wherein the control performance index comprises at least one of:

a first control performance index prioritizing the target traveling time, a second control performance index prioritizing a load reduction of a power generator that generates power to drive the machine, and a third control performance index prioritizing the target traveling time and the load reduction of the power generator.

4. The instruction generating device according to claim 3, wherein a priority set to each of the vibration control conditional expressions is stored in the storage in each control performance index, and the processor is configured with the program to perform operations such that operation as the conditional expression selector is further configured to select the vibration control conditional expression having a highest priority corresponding to the input control performance index from the plurality of vibration control conditional expressions, and operation as the parameter calculator is further configured to calculate the parameter satisfying both the machine performance index and the vibration control conditional expression having the highest priority.

5. The instruction generating device according to claim 4, wherein the processor is configured with the program to perform operations such that operation as the conditional expression selector is further configured to select the vibration control conditional expression having a second highest priority from the plurality of vibration control conditional expressions, and operation as the parameter calculator is further configured to calculate the parameter satisfying both the machine performance index and the vibration control conditional expression having the second highest priority, and the operations as the conditional expression selector and the parameter calculator are repeatedly performed, in response to the receiver receiving the input of the first control performance index, and in response to the parameter calculator failing to calculate the parameter satisfying both the machine performance index and the selected vibration control conditional expression.

6. The instruction generating device according to claim 5, wherein the processor is configured with the program to perform operations such that, in response to the parameter calculator failing to calculate the parameter satisfying both the machine performance index and the vibration control conditional expression with respect to all the vibration control conditional expressions, operation as the parameter calculator is further configured to perform extraction processing of calculating a parameter satisfying the vibration control conditional expression and the machine performance index except for the target traveling time with respect to each of the vibration control conditional expressions and of extracting the parameter closest to the target traveling time from the calculated parameters.

7. The instruction generating device according to claim 4, wherein the priority corresponding to the first control performance index is set to each vibration control conditional expression according to time from acceleration start to deceleration end, the time being obtained from a solution calculated using an identical frequency with respect to each vibration control conditional expression.

8. The instruction generating device according to claim 4, wherein the processor is configured with the program to perform operations such that, in response to the receiver receiving the input of the second control performance index, and in response to the parameter calculator failing to calculate the parameter satisfying both the machine performance index and the selected vibration control conditional expression, operation as the parameter calculator is further configured to perform extraction processing of calculating a parameter satisfying the selected vibration control conditional expression and the machine performance index except for the target traveling time and of extracting the parameter closest to the target traveling time from the calculated parameters.

9. The instruction generating device according to claim 8, wherein the processor is configured with the program to perform operations such that operation as the conditional expression selector is further configured to select the vibration control conditional expression having a second highest priority, and operation as the parameter calculator is further configured to calculate the parameter based on the vibration control conditional expression, the operations as the conditional expression selector and the parameter calculators are repeatedly performed in response to the parameter calculator failing to extract the parameter in the extraction processing.

10. The instruction generating device according to claim 4, wherein the priority corresponding to the second control performance index is set to each vibration control conditional expression according to a load ratio of the power generator, the load ratio being obtained from a solution calculated using an identical frequency with respect to each vibration control conditional expression.

11. The instruction generating device according to claim 4, wherein the processor is configured with the program to perform operations such that operation as the conditional expression selector is further configured to select the vibration control conditional expression having a second highest priority from the plurality of vibration control conditional expressions, and operation as the parameter calculator is further configured to calculate the parameter satisfying both the machine performance index and the vibration control conditional expression having the second highest priority, the operations as the conditional expression selector and the parameter calculator are repeatedly performed in response to the receiver receiving the input of the third control performance index, and in response to the parameter calculator failing to calculate the parameter satisfying both the machine performance index and the selected vibration control conditional expression.

12. The instruction generating device according to claim 11, wherein the processor is configured with the program to perform operations such that, in response to the parameter calculator failing to calculate the parameter satisfying both the machine performance index and the vibration control conditional expression with respect to all the vibration control conditional expressions, operation as the conditional expression selector is further configured to perform extraction processing of calculating a parameter satisfying the vibration control conditional expression and the machine performance index except for the target traveling time with respect to each of the vibration control conditional expressions and of extracting the parameter closest to the target traveling time from the calculated parameters.

13. An instruction generating device that generates a position instruction of instruction information to drive a machine, the instruction generating device comprising:
a receiver that receives an input of a machine performance index comprising at least a target traveling distance, a target traveling time, and a resonance frequency of a vibration to become a vibration control target; and
a processor is configured with a program to perform operations comprising:
operation as a parameter calculator configured to calculate a parameter based on the machine performance index and each of a plurality of vibration control conditional expressions with respect to the plurality of vibration control conditional expressions calculating the parameter of the position instruction suppressing the vibration based on the machine performance index;
operation as a parameter evaluator configured to evaluate the calculated parameter based on a control performance index indicating an item to be prioritized during drive control of the machine; and
operation as a position instruction generator configured to generate the position instruction based on the parameter most highly evaluated with the parameter evaluator.

14. The instruction generating device according to claim 13, wherein the processor is configured with the program to perform operations such that operation as the parameter calculator is further configured to calculate the parameter satisfying both the machine performance index and the vibration control conditional expression with respect to each of the plurality of vibration control conditional expressions.

15. The instruction generating device according to claim 14, wherein the processor is configured with the program to perform operations such that in response to the parameter calculator failing to calculate the parameter satisfying both the machine performance index and the vibration control conditional expression with respect to each of the plurality of vibration control conditional expressions, operation as the parameter calculator is further configured to perform extraction processing of calculating a parameter satisfying the vibration control conditional expression and the machine performance index except for the target traveling time with respect to the vibration control conditional expression and of extracting the parameter closest to the target traveling time from the calculated parameters.

16. The instruction generating device according to claim 13, wherein the receiver receives the input of the control performance index, and the processor is configured with the program to perform operations such that operation as the parameter evaluator is further configured to evaluate the calculated parameter based on the control performance index received with the receiver.

17. The instruction generating device according to claim 16, wherein the control performance index comprises at least one of:
a first control performance index prioritizing a target traveling time,
a second control performance index prioritizing a load reduction of a power generator that generates power to drive the machine, and
a third control performance index prioritizing the target traveling time and the load reduction of the power generator.

18. The instruction generating device according to claim 17, wherein the processor is configured with the program to perform operations such that, in response to the receiver receiving the input of the first control performance index, operation as the parameter evaluator is further configured to prioritize evaluating a parameter of a traveling time closest to the target traveling time in the parameters calculated with the parameter calculator.

19. The instruction generating device according to claim 17, wherein the processor is configured with the program to perform operations such that, in response to the receiver receiving the input of the second control performance index, operation as the parameter evaluator is further configured to prioritize evaluating a parameter having a smallest load ratio of the power generator in the parameters calculated with the parameter calculator.

20. The instruction generating device according to claim 17, wherein the processor is configured with the program to perform operations such that, in response to the receiver receiving the input of the third control performance index, operation as the parameter evaluator is further configured to prioritize evaluating a parameter of a traveling time closest to the target traveling time in the parameters calculated with the parameter calculator.

21. The instruction generating device according to claim 20, wherein the processor is configured with the program to perform operations such that, in response to the existence of a plurality of parameters that satisfy the traveling time closest to the target traveling time, operation as the parameter evaluator is further configured to prioritize evaluating a parameter of a traveling time having a smallest load ratio of the power generator in the plurality of parameters.

* * * * *